(12) United States Patent
Chen et al.

(10) Patent No.: US 7,450,770 B2
(45) Date of Patent: Nov. 11, 2008

(54) ARCHITECTURE AND METHOD FOR PARALLEL EMBEDDED BLOCK CODING

(75) Inventors: Liang-Gee Chen, Taipei (TW); Hung-Chi Fang, Taipei (TW); Yu-Wei Chang, Taipei (TW); Tu-Chih Wang, Taipei (TW); Ya-Yun Shih, Taipei (TW)

(73) Assignee: National Taiwan University, Taipei (TW)

( * ) Notice: Subject to any disclaimer, the term of this patent is extended or adjusted under 35 U.S.C. 154(b) by 756 days.

(21) Appl. No.: 10/739,067

(22) Filed: Dec. 19, 2003

(65) Prior Publication Data

US 2005/0135688 A1  Jun. 23, 2005

(51) Int. Cl.
G06K 9/36 (2006.01)
(52) U.S. Cl. ................... 382/234; 375/240.19
(58) Field of Classification Search ................... 382/234
See application file for complete search history.

(56) References Cited

U.S. PATENT DOCUMENTS 6,978,048 B1 * 12/2005 Higginbottom et al. ..... 382/240

OTHER PUBLICATIONS

Hung-Chi Fang, et al.; High Speed Memory Efficient Ebcot Architecture for JPEG2000; 2003; pp. II736-II739.
Hung-Chi Fang et al.; Novel Word-Level Algorithm of Embedded Block Coding in JPEG 2000; 2003; pp. I137-I140.

* cited by examiner

Primary Examiner—Matthew C Bella
Assistant Examiner—Sath V. Perungavoor
(74) Attorney, Agent, or Firm—Troxell Law Office, PLLC

(57) ABSTRACT

The present invention provides a high-speed, memory efficient parallel coding technique for embedded block coding with optimized truncation (EBCOT) used in still image compression. Attributing to parallel processing method and structure, it processes a discrete wavelet transform (DWT) coefficient at a clock cycle without any state variable stored. Therefore, the need of state variable memory can be avoid and the external memory bandwidth can be reduced. With the same cost of chip-area and lower power consumption, the processing rate of this invention is several times higher than conventional schemes. Furthermore, the present invention processes 50 M coefficients per second at 100 MHz and can encode lossless HDTV 720 p resolution pictures at 30 fps in real time.

10 Claims, 14 Drawing Sheets

| $\sigma^{\chi h0}_{h0}$ ($\sigma^{\chi v0}_{v0}$) | $\chi_{h0}$ ($\chi_{v0}$) | $\sigma^{\chi h1}_{h1}$ ($\sigma^{\chi v1}_{v1}$) | $\chi_{h1}$ ($\chi_{v1}$) | $H^{\chi}$ ($V^{\chi}$) |
|---|---|---|---|---|
| 1 | 0 | 1 | 0 | 1 |
| 1 | 0 | 0 | X | 1 |
| 0 | X | 1 | 0 | 1 |
| 1 | 1 | 1 | 0 | 0 |
| 1 | 0 | 0 | 1 | 0 |
| 0 | X | 1 | X | 0 |
| 1 | 1 | 0 | 1 | -1 |
| 1 | 1 | 0 | X | -1 |
| 0 | X | 1 | 1 | -1 |

Fig. 2

| Architecture | Speed (cycles/sample) | Gate count | Memory (bits) | Bandwidth (times/sample) |
|---|---|---|---|---|
| [3] | 3×n-2 | - | - | - |
| [4] | 1.3×n | 19000 | 5×$N^2$ | n |
| [5] | 1.3×n | 21589 | 4×$N^2$ | n |
| [6] | N | 23927 | 4×$N^2$ | n |
| Ours | 1.5 | 91758 | 12×N | 1 |

The n value and N are selected the group consisting of 6 and 64.

Fig. 14

ARCHITECTURE AND METHOD FOR PARALLEL EMBEDDED BLOCK CODING

FIELD OF THE INVENTION

The present invention relates to a coding apparatus and method for still image compression and particularly to the architecture and method for parallel embedded block coding.

BACKGROUND OF THE INVENTION

JPEG 2000 is the latest standard for still image coding. Instead of JPEG, with excellent coding performance and abundant features, it may become the most popular still image coding standard applying in digital cameras, digital video cameras and other digital devices.

In JPEG 2000, however, embedded block coding is the most complicated part as well as a hot topic investigated by researchers. Conventional coding schemes process code-block bit-plane by bit-plane in serial, and have many drawbacks listed as follows:

1. The processing rate is slow.
2. The requirement of on-chip random access memory is high.
3. The efficiency and integration of the system is poor, because it accesses off-chip memory by bit-plane as a unit.

The present invention has solved the above problems with parallel coding technique. It speeds up the processing rate and avoids the requirement of memory for state variables. Furthermore, it greatly improves the access scheme of external memory and facilitates integration of the coder by dealing with a discrete wavelet transform (DWT) coefficient at word-level in each time.

SUMMARY OF THE INVENTION

Therefore, a primary object of the present invention is to provide an image processing system for real-time image compression products, such as digital cameras, digital video cameras, real-time surveillance systems, or any lossless compression for medical or military imagery.

Another object of the present invention is to provide a coding method to treat all bit-planes in parallel at a time under the latest standard of still image compression.

Still another object of the present invention is to provide a high speed, efficient memory architecture for embedded block coding. With the same cost of chip area, it increases the processing rate and decreases the memory bandwidth by a factor of six comparing to state-of-the-art technology.

In order to achieve the foregoing objects, the coding method shows a DWT coefficient having a plurality of bit-planes in parallel at a time to provide coding information for further coding process, comprising the steps of:

(a) Acquire a target coefficient and eight neighboring coefficients around said target coefficient.
(b) Assign a first contribution to each bit-plane of the neighboring coefficients in respect to the location of their MSB and determining coding pass of each bit-plane of said target coefficient by said contributions.
(c) Calculate first group of state variables of every bit-plane of said target and neighboring coefficients in respect to the location of their MSBs.
(d) Assign a second contribution to each bit-plane of said target and said neighboring coefficients according to said first group of state variables and coding pass of said target and neighboring coefficients and determining magnitude coding information obtained through a first predefined table using said second contributions as references.
(e) Calculating second group of state variables of said neighboring coefficients according to said first group of state variables.
(f) Assign a third contribution to the neighboring coefficients according to said second group of state variables and determining sign coding information obtained through a second predefined table using said third contributions as references.

The coding apparatus processes a DWT coefficient having a plurality of bit-planes in parallel at a time to provide coding information for further coding process. The apparatus comprises a Gobang register bank (GRB) module, a compute most significant bit pass (CMP) module, find contribution and coding pass (FC) modules, context formation (CF) modules, a reconfigurable first-in first-out register (RFIFO) module, and arithmetic encoder (AE) modules, wherein there are one said FC module and one said CF module for each bit-plane and at one AE module for every two bit-planes.

BRIEF DESCRIPTION OF THE DRAWINGS

These and other objects, features, and advantages of the present invention will become apparent with reference to the following descriptions and accompanying drawings, in which:

FIG. 2 is a table showing the sign coding information produced by contributions according to the present invention;

FIG. 14 is a table showing performance between the present and conventional invention.

DETAIL DESCRIPTION OF PREFERRED EMBODIMENTS

The following descriptions of the preferred embodiments are provided to understand the features and the structures of the present invention.

The present invention is a parallel embedded block coding which codes all bit-planes in parallel for increasing the processing speed and decreasing the memory bandwidth with the same cost of chip-area comparing with conventional schemes. Please referring to FIG. 1 and FIG. 2, the coding method of the present invention is described the following step.

Figure 1:
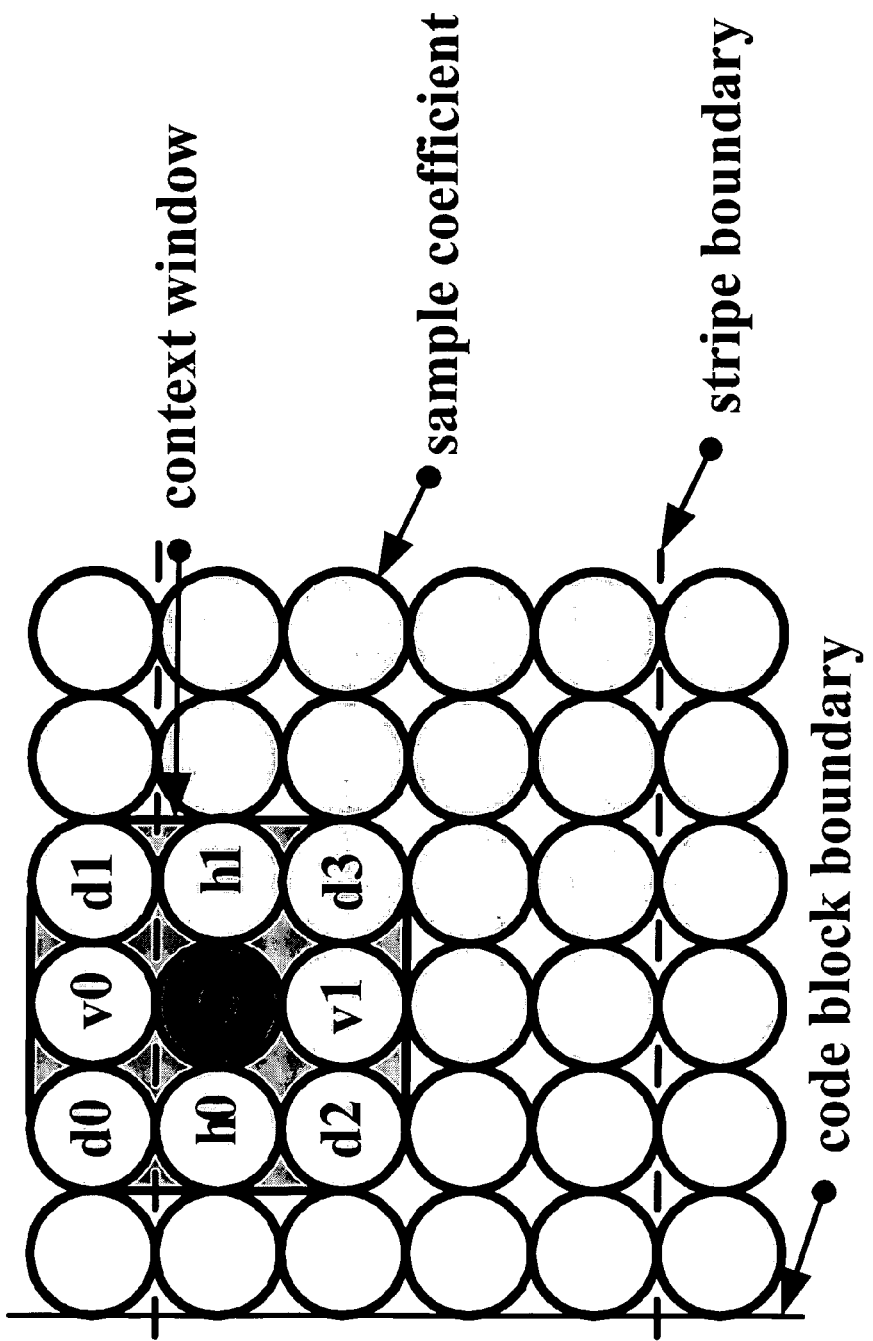
FIG. 1 is a view showing the coefficients in the context window according to the present invention.

In the step (a), a target coefficient and eight neighboring coefficients around said target coefficient are acquired. Referring to FIG. 1, the symbol c denotes the target coefficient and d0, v0, d1, h0, h1, d2, v1, and d3 denote the neighboring coefficients where prefixes d, v, and h mean the diagonal, vertical, and horizontal relationship in respect to the target.

In the step (b), a first contribution of each bit-plane of said neighboring coefficients in respect to the location of their MSB is obtained. If the neighboring coefficient s process after the target coefficient, like h1, v1, and d3 shown in FIG. 1, the first contribution $$\phi_s^k = \begin{cases} 0, & k \geq m_s \\ 1, & k < m_s \end{cases},$$

and if the neighboring coefficient s is processed before the target coefficient, the first contribution $$\phi_s^k = \begin{cases} 1, & k < m_s \\ 1, & (k = m_s) \, \& \, (p_s^{m_s} = 1) \\ 0, & \text{otherwise} \end{cases}.$$

The symbol $m_s$ appearing in the above functions is obtained from $$m_s = \begin{cases} -1, & \mu_s = 0 \\ m, & 2^m \leq \mu_s < 2^{m+1} \end{cases}$$

where the symbol $\mu_s$ denotes the magnitude of the coefficient s.

Next, after acquiring contributions $\phi_s$ of said neighboring coefficients, the coding pass $p_c^k$ of coefficient c at k-th bit-plane is determined by a following function:

$$p_c^k = \begin{cases} 2, & k < m_c \\ 3, & k = m_c \, \& \, \sum \phi_s = 0 \\ 1, & \text{otherwise} \end{cases}.$$

In step (c), first group of state variables of every bit-plane in coefficients in respect to the location of its MSB obtain wherein said state variables comprising a first variable $\lambda_s^k$ and a second variable $\kappa_s^k$. The first variable $\lambda_s^k$ denotes whether the coefficient s in k-th bit-plane is lower than its most significant bit (MSB) obtained by $$\lambda_s^k = \begin{cases} 1, & k < m_s \\ 0, & k \geq m_s \end{cases}.$$

The second variable $\kappa_s^k$ denotes whether the coefficient s in k-th bit-plane is the most significant bit (MSB) obtained by $$\kappa_s^k = \begin{cases} 1, & k = m_s \\ 0, & k \neq m_s \end{cases}.$$

In the step (d), the second contribution of each bit-plane of said neighboring coefficients according to said first group of state variables and coding pass of said target and neighboring coefficients obtain. If the neighboring coefficient s is processed after the target coefficient, the second contribution $\sigma_s^k$ of the coefficient s in k-th bit-plane is obtained by $$\sigma_s^k = \begin{cases} \lambda_s^k, & \kappa_s^k = 0 \\ 1, & \kappa_s^k = 1 \, \& \, p_c^k \neq 1 \, \& \, p_s^k \neq 1 \\ 0, & \text{otherwise} \end{cases}.$$

If the neighboring coefficient s is processed before the target coefficient, the second contribution $\sigma_s^k$ of the coefficient s in k-th bit-plane is obtained by $$\sigma_s^k = \begin{cases} \lambda_s^k, & \kappa_s^k = 0 \\ 0, & \kappa_s^k = 1 \, \& \, p_c^k \neq 3 \, \& \, p_s^k \neq 1 \\ 1, & \text{otherwise} \end{cases}.$$

Next, after acquiring eight numbers of second contributions, the second contributions are summed separately by groups of horizontal, vertical, and diagonal coefficients in respect to the target. The contribution summations are $$H^k = \sum_{i=0}^{1} \sigma_{hi}^k$$

$$V^k = \sum_{i=0}^{1} \sigma_{vi}^k$$

$$D^k = \sum_{i=0}^{3} \sigma_{di}^k.$$

Next, contexts for the magnitude coding is determined through the first table predefined in compliance with JPEG 2000 standard using said contribution summations as references.

In step (e), second group of state variables of neighbors obtained wherein said state variables comprising a third variable $\alpha_s$ and a fourth variable $\beta_s$. The third variable represents the relative location of MSBs of said target coefficient and the neighboring coefficient s and is obtained by $$\alpha_s = \sum_k \lambda_s^k \ \& \ \kappa_c^k.$$

The fourth variable represents whether or not the MSBs of said target coefficient and the neighboring coefficient s are in the same bit-plane and is obtained by $$\beta_s = \sum_k \kappa_s^k \ \& \ \kappa_c^k.$$

In step (f), it can introduce a new variable. A variable $\chi^s$ denotes the sign (0 for positive) of coefficient s. Next, there are only four coefficients, including horizontal and vertical ones, concerned. If the neighboring coefficient s is processed after the target coefficient c, the third contributions $\sigma_s^{\chi_s}$ are obtained by $$\sigma_s^{\chi_s} = \begin{cases} \alpha_s, & \beta_s = 0 \\ 1, & \beta_s = 1 \ \& \ p_c^{m_c} \neq 1 \ \& \ p_s^{m_c} = 1 \\ 0, & \text{otherwise} \end{cases}.$$

Otherwise, the third contributions $\sigma_s^{\chi_s}$ are obtained by $$\sigma_s^{\chi_s} = \begin{cases} \alpha_s, & \beta_s = 0 \\ 1, & \beta_s = 1 \ \& \ p_c^{m_c} \neq 3 \ \& \ p_s^{m_c} = 1 \\ 0, & \text{otherwise} \end{cases}.$$

Next, after obtaining third contributions, parameters $H^\chi$ and $V^\chi$ can be determined through a table shown in FIG. 2. Therefore, the sign coding information can be determined.

From the FIG. 3 to FIG. 14, the coding apparatus of the present invention is described the following descriptions.

Figure 3:
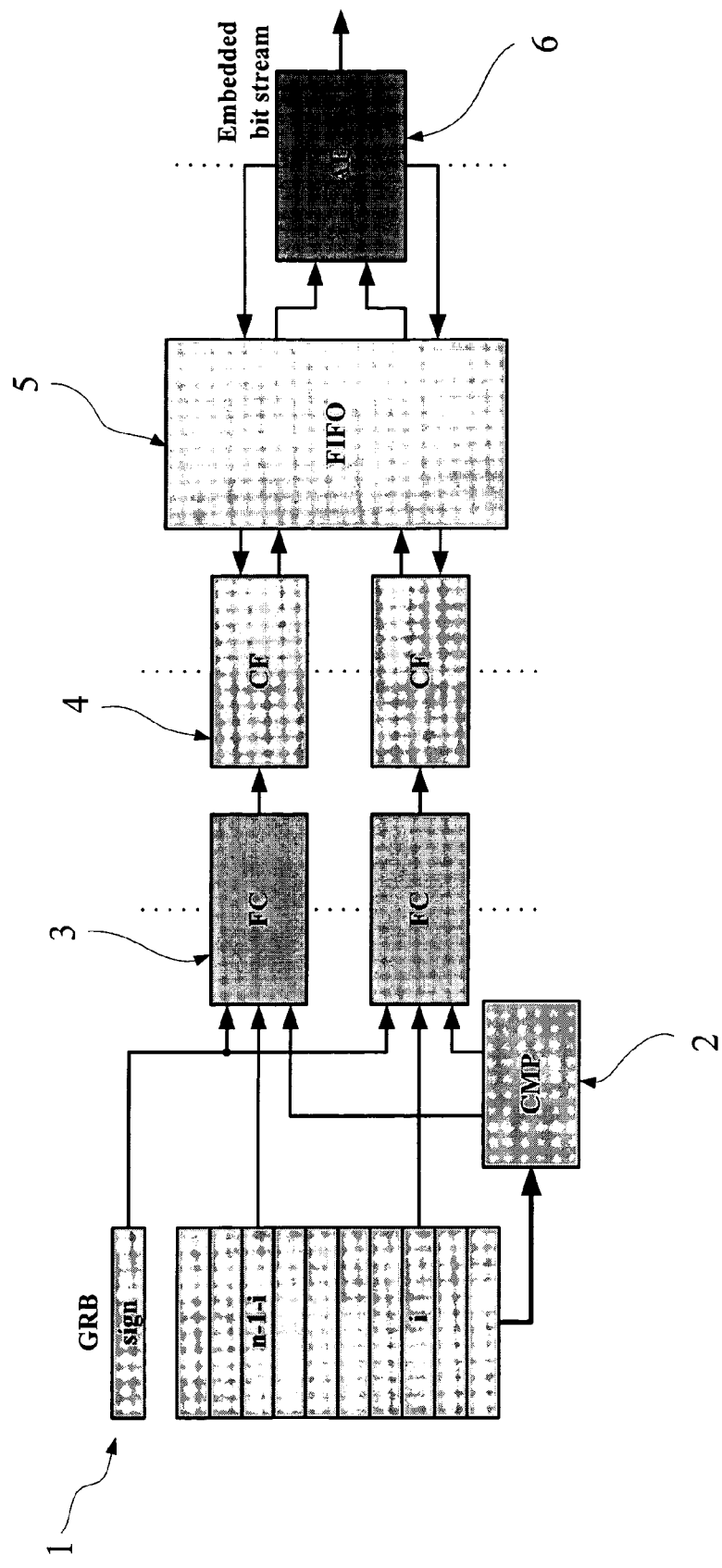
FIG. 3 is a view showing the coding apparatus according to the present invention.

Referring to FIG. 3, the coding apparatus process a DWT coefficient having a plurality of bit-planes in parallel at a time to provide coding information for further coding process. The apparatus comprise a Gobang register bank (GRB) module 1, a compute most significant bit (MSB) pass (CMP) module 2, find contribution and coding pass (FC) modules 3, context formation (CF) modules 4, a reconfigurable first-in first-out register (RFIFO) module 5, and arithmetic encoder (AE) modules 6. There are one said FC module 3 and one said CF module 4 for each bit-plane and one AE module 6 for every two bit-planes.

Figure 4:
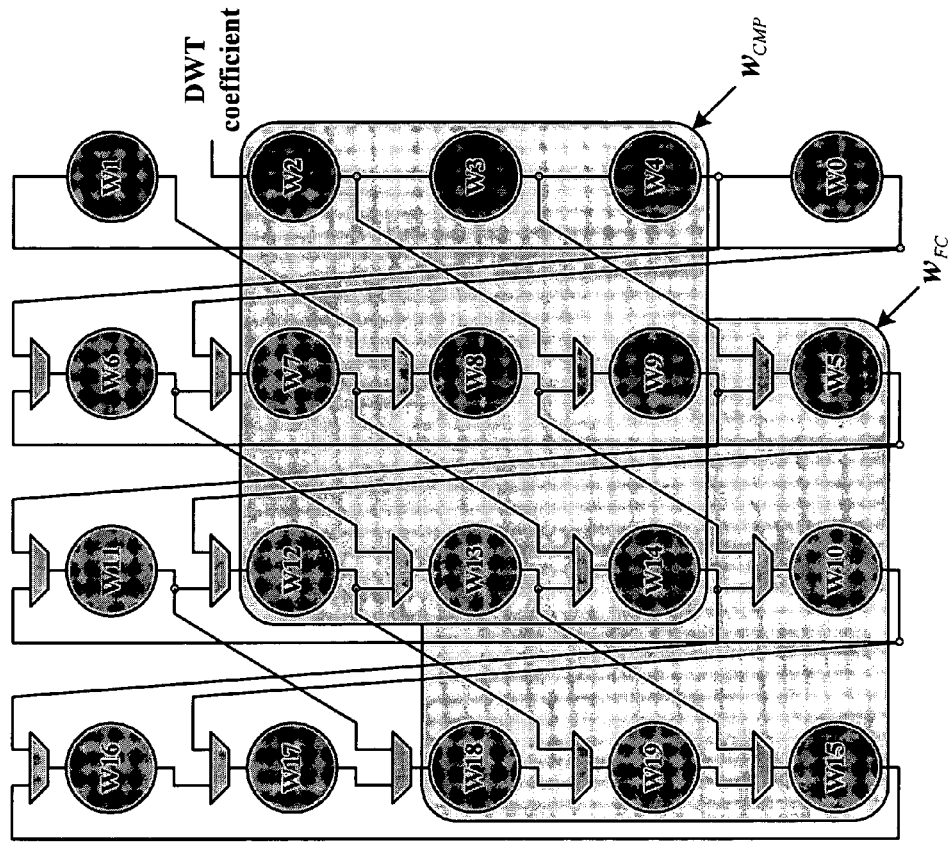
FIG. 4 is a view showing a structure of the Gobang register bank (GRB) module according to the present invention.

The Gobang register bank module 1 is a 2-dimensional shift register bank, as shown in FIG. 4, whereby discrete wavelet coefficients are recorded to meet JPEG 2000 scan order. The input data is first rotated within each column to match the data flow of one column in the stripe in a clock cycle (for example: W1→W2, W2→W3, W3→W4, W4→W0, W0→W1). When a column in the stripe is coded, every four clock cycles, the date samples are shifted to next column for the next column in the stripe (for example: W1→W7, W2→W8, W3→W9, W4→W5, W0→W6). The symbols $\omega_{CMP}$ and $\omega_{FC}$ indicate two sets of 3×3 registers to form the context windows for CMP and FC modules 2, 3.

Figure 5:
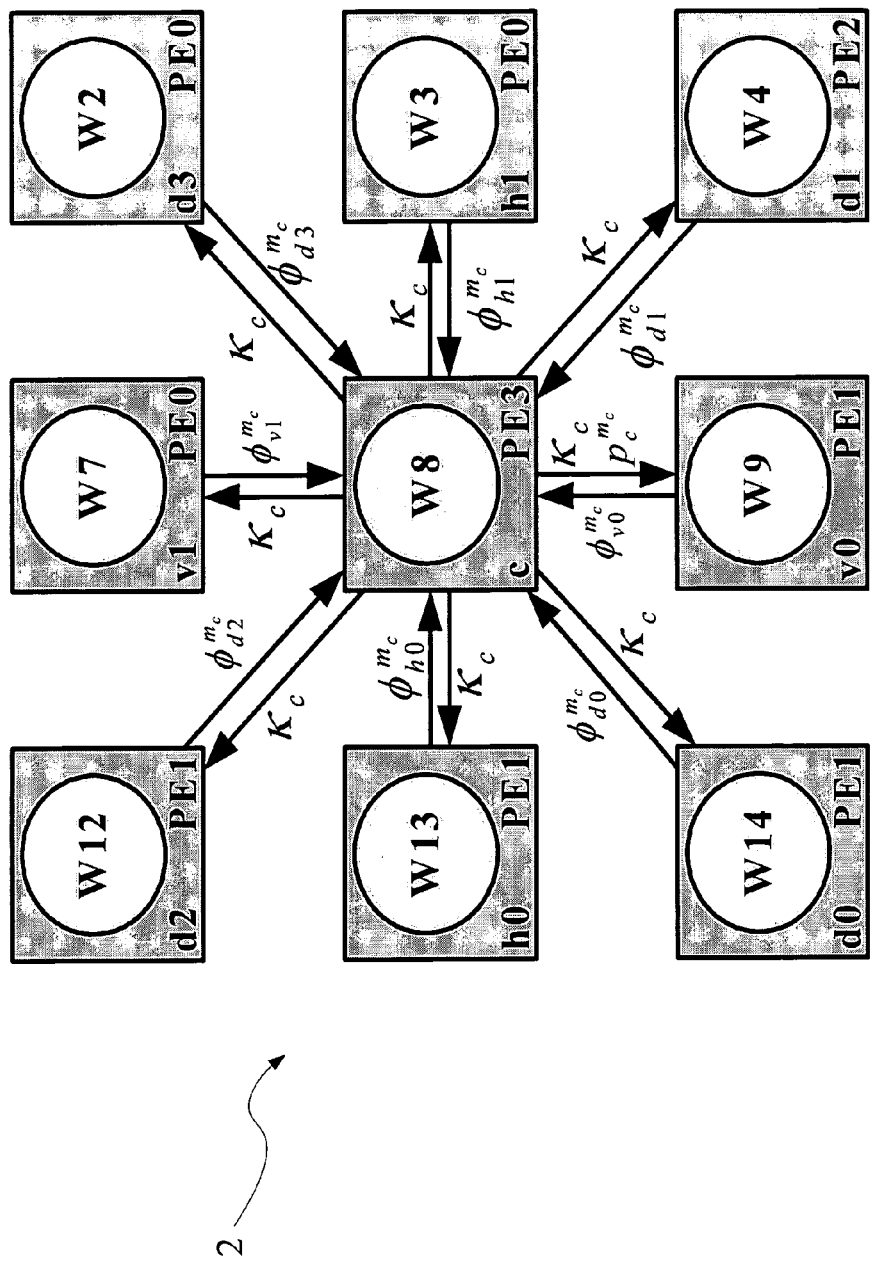
FIG. 5 is a view showing a structure of the compute most significant bit (MSB) pass (CMP) module according to the present invention.
Figure 6:
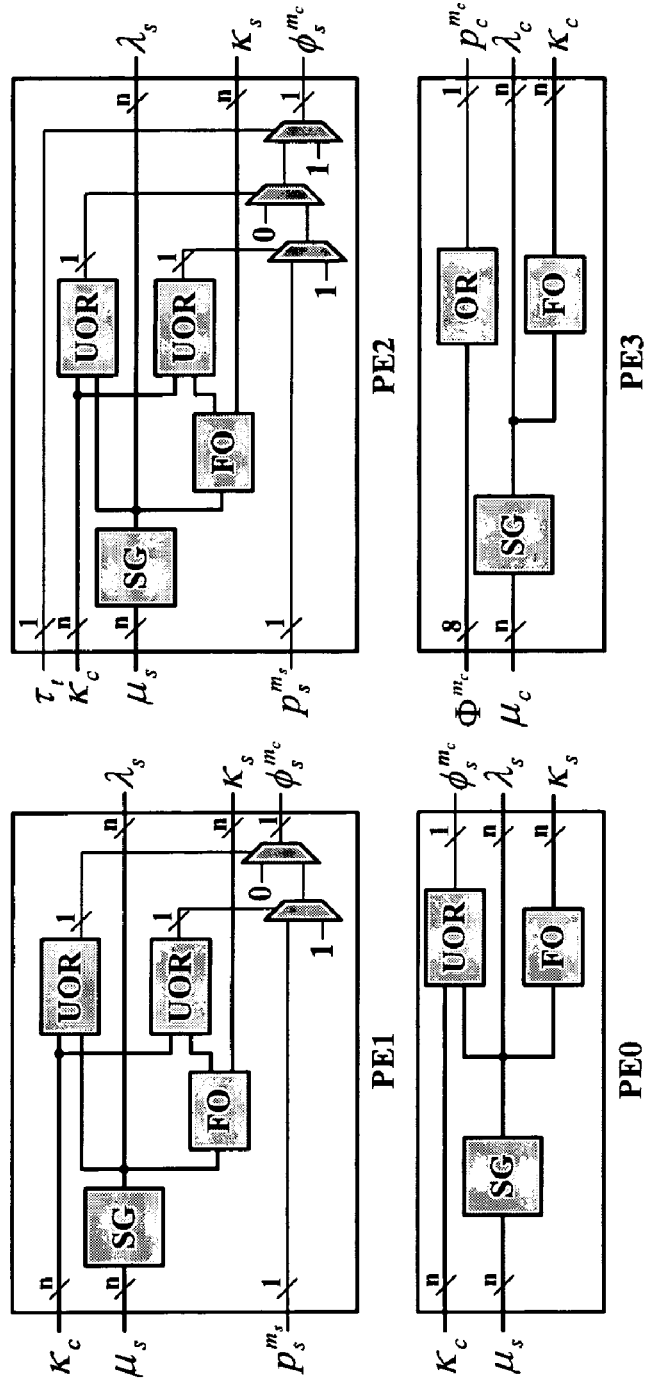
FIG. 6 is a view showing processing elements of the compute most significant bit (MSB) pass (CMP) module according to the present invention.

The compute MSB pass (CMP) module 2, as shown in FIG. 5, determines a value $p_c^{m_c}$ of target coefficient and the variables $\lambda_s^k$ and $\kappa_s^k$ of each coefficient. With these variables, every bit-plane can be computed independently by module after compute MSB pass (CMP) module 2. In this way, power consumption is able to reduce by turning off modules when there is no data in corresponding bit-planes. FIG. 6 shows a detail circuit diagram of processing elements (PE) of this module 2. In FIG. 6, the device UOR treats all bit-planes of two inputs by OR operation and further treats the results by OR operation as an output, i.e. the output is "1" if, for some bit-plane, both bit of two inputs are "1". The sub-mode SG composed of simple AND and OR gates that calculates $\kappa_s^k$. The sub-module OF is the first one detector.

Figure 7:
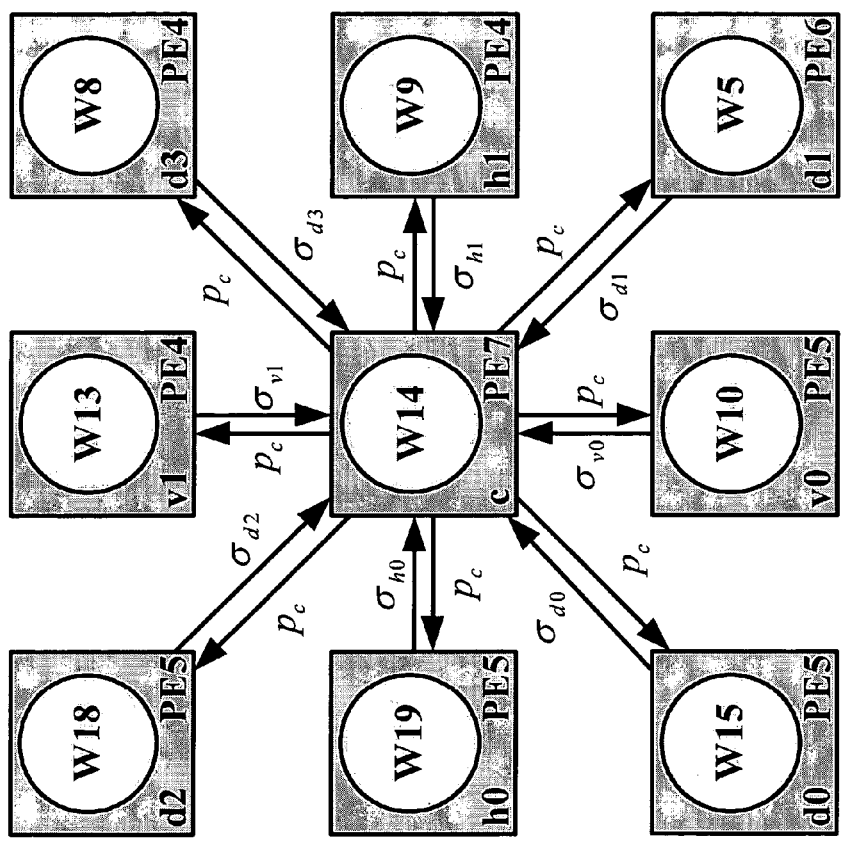
FIG. 7 is a view showing a structure of the find contribution and coding pass (FC) module according to the present invention.
Figure 8:
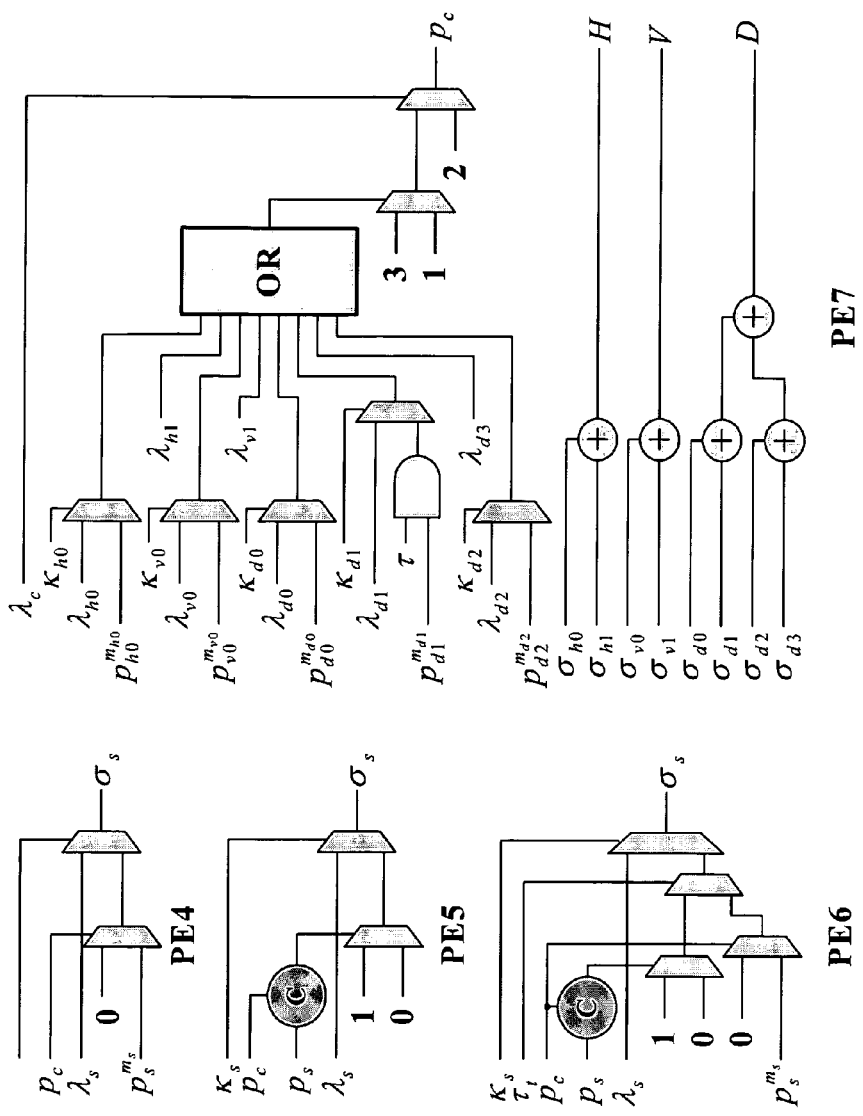
FIG. 8 is a view showing processing elements of the find contribution and coding pass (FC) module according to the present invention.
Figure 9:
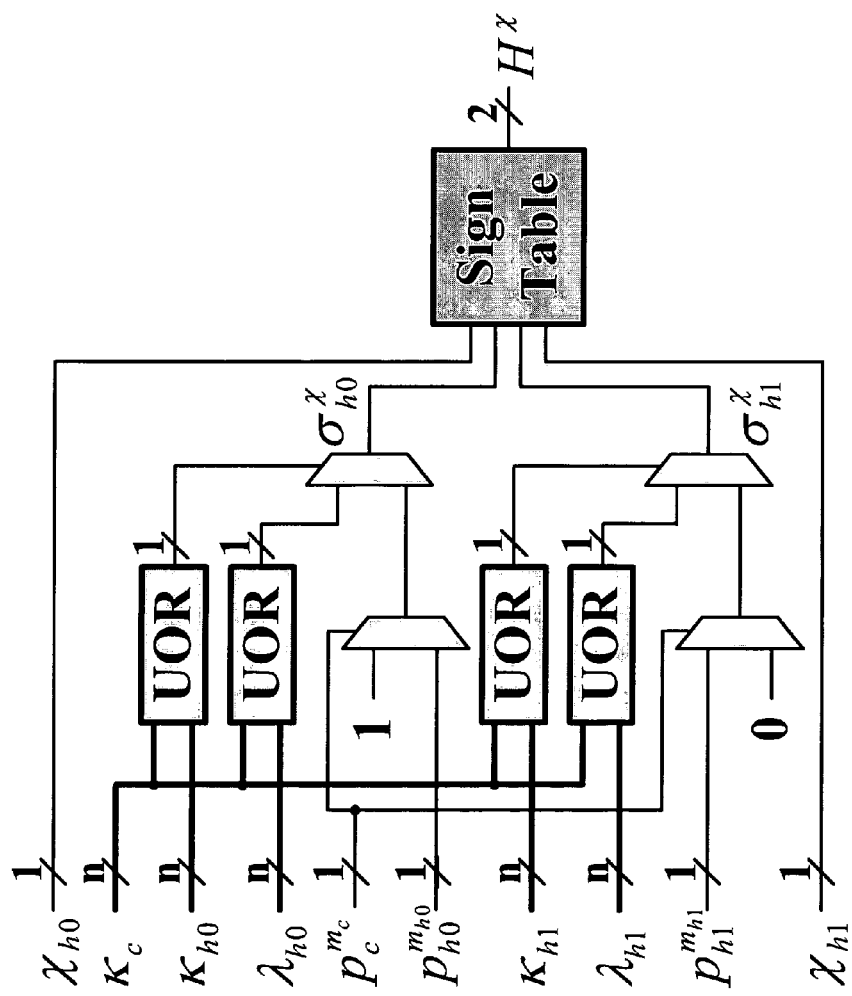
FIG. 9 is view showing a function of $H^x$ according to the present invention.

The find contribution and coding pass (FC) module 3, which is shown in FIG. 7, determines the coding pass information and calculates the PHVD (Coding pass and HVD contributions) values to form the context. The circuit diagram of processing elements of FC module 3 is shown in FIG. 8. FIG. 9 shows the circuit diagram function $H^\chi$ directly derived from the algorism. The circuit of function $V^\chi$ is the same as $H^\chi$.

Figure 10:
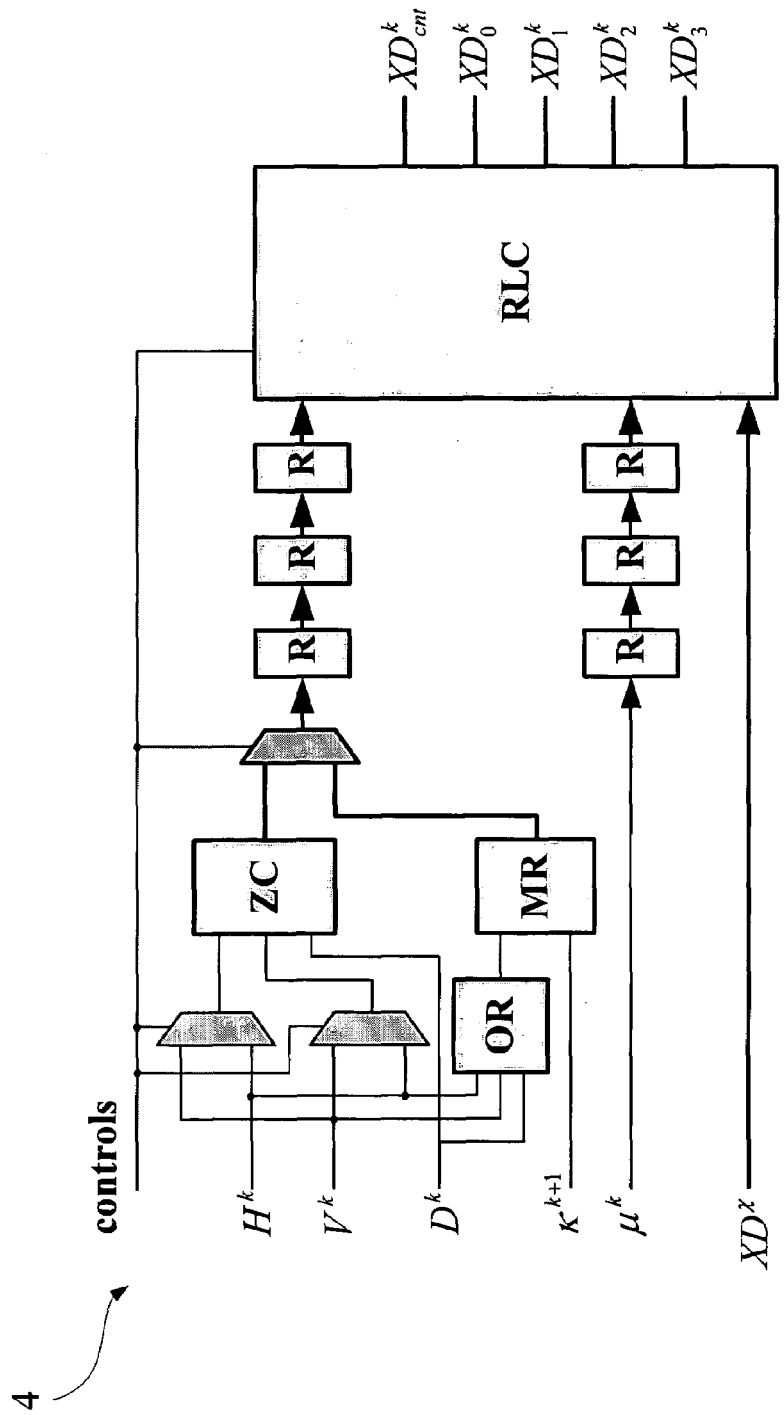
FIG. 10 is a view showing a structure of the context formation (CF) module according to the present invention.
Figure 11:
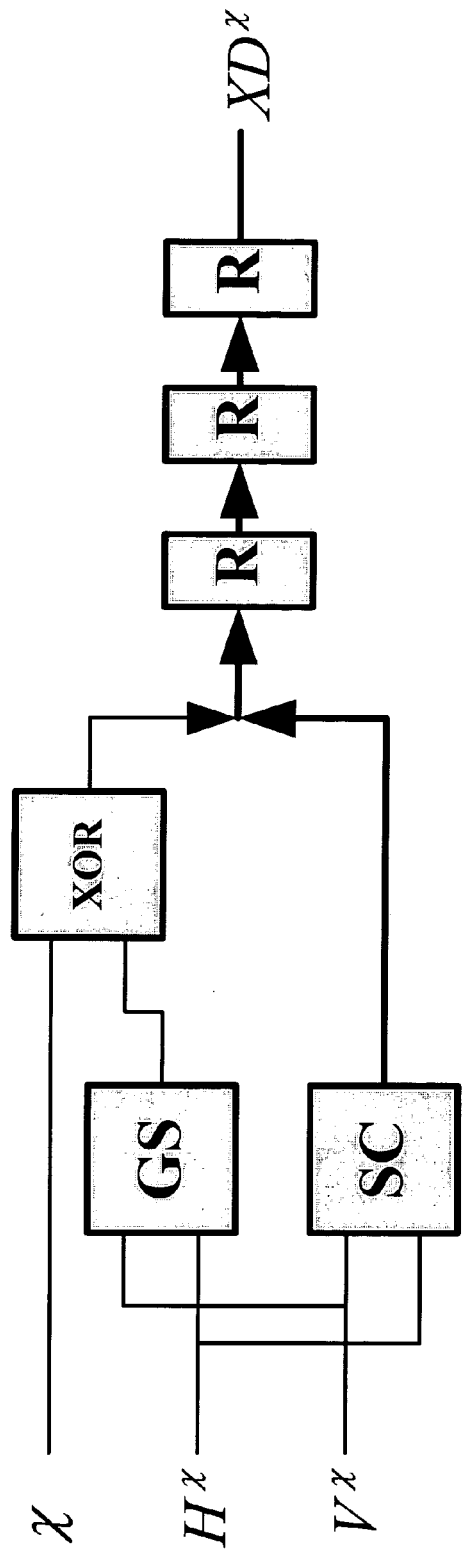
FIG. 11 is a view showing a function of $XD^x$ according to the present invention.

FIG. 10 shows the context formation (CF) module 4 wherein the zero coding (ZC) module and the magnitude refinement (MR) module operate through tables defined to meet standard. In order to cope with the run-length code (RLC), the four contexts for the four samples in a column of stripe are buffered. After deciding the RLC, the contexts are generated. On the contrary, the other way to generate contexts needs to store HVD values and the coding pass information in registers and uses more chip area. Two-thirds of chip-area for the buffers can be reduced by choosing the former method. In one clock cycle, there are at most four contexts produced. Furthermore, FIG. 11 shows the circuit diagram providing the context of sign denoted by $XD^\chi$ and the truth table for the GS and SC sub-module. It is important that the circuit diagram shown in FIG. 10 is needed for every bit-plane while only one circuit shown in FIG. 11, for passing results to every bit-plane, is needed for all.

Figure 12:
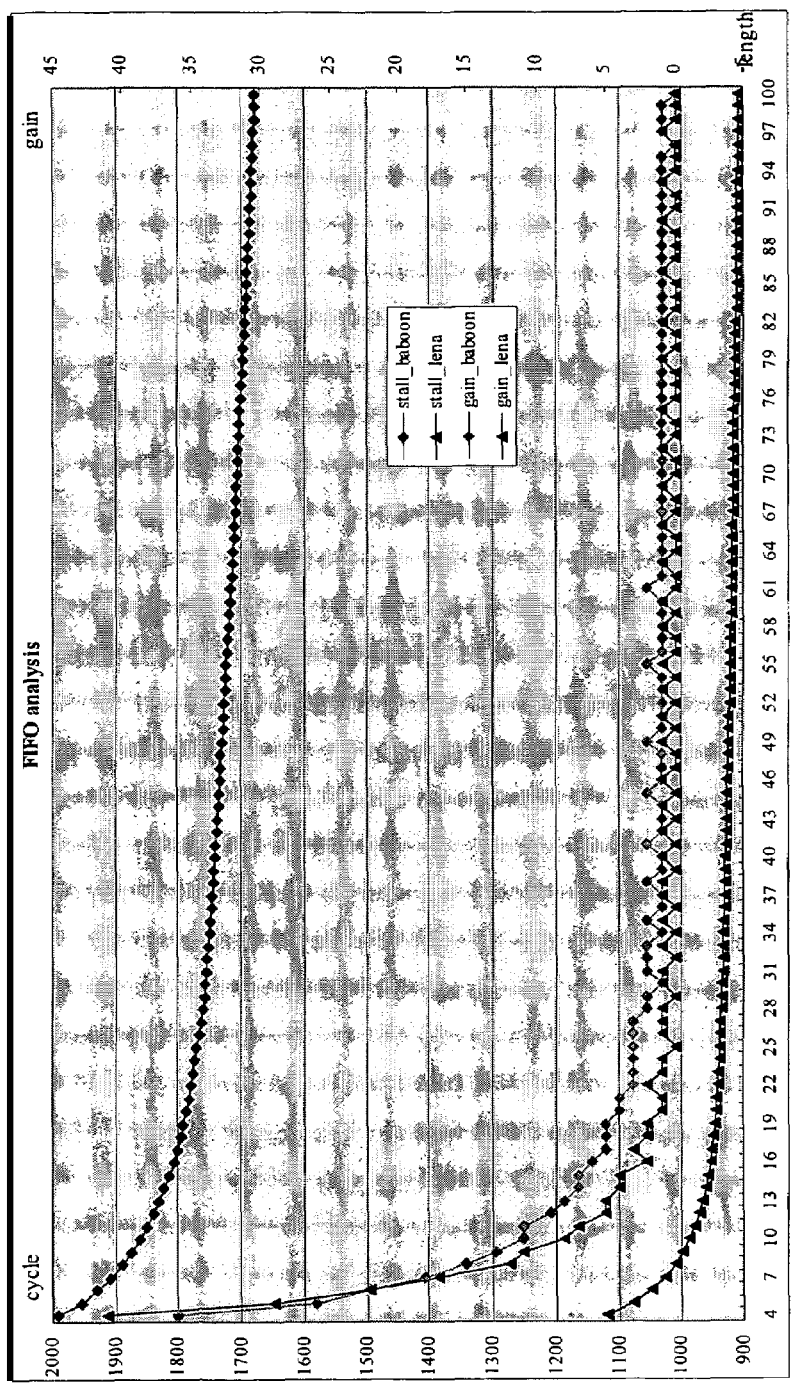
FIG. 12 is a view showing the relationship between length of first-in first-out register (FIFO) and the number of clock cycle according to the present invention.

The reconfigurable first-in first-out register (RFIFO) module 5 uses first-in first-out (FIFO) to smooth the compression process. While the number of contexts produced by CF module 4 ranges from 0 to 4, the average producing number is one and the producing number of following AE module 6 is also one. FIG. 12 shows a result of simulation comparing the length of FIFO (or number of registers) with the average amount of clock used for a code-block. Referring to FIG. 12, it is more efficient when the length of FIFO register is 15. However, the requirement of registers is too more. In order to lower down the hardware requirement, it is suitable to utilize the embedded block coding feature by using reconfigurable first-in first-out (RFIFO) module 5. Finally, two 15-length and eight 4-length FIFOs can achieve 80% performance of conventional structure, which requires ten 15-length FIFOs.

In a best embodiment, a configuration having two 15-length and eight 4-length FIFO registers when processing a new block coding is more efficient. After theoretical analysis, it is more efficient to allocate FIFO registers to third and fourth bit-planes of the block. Therefore, in the beginning of block coding, RFIFO module 5 is reconfigured according to MSB.

Figure 13:
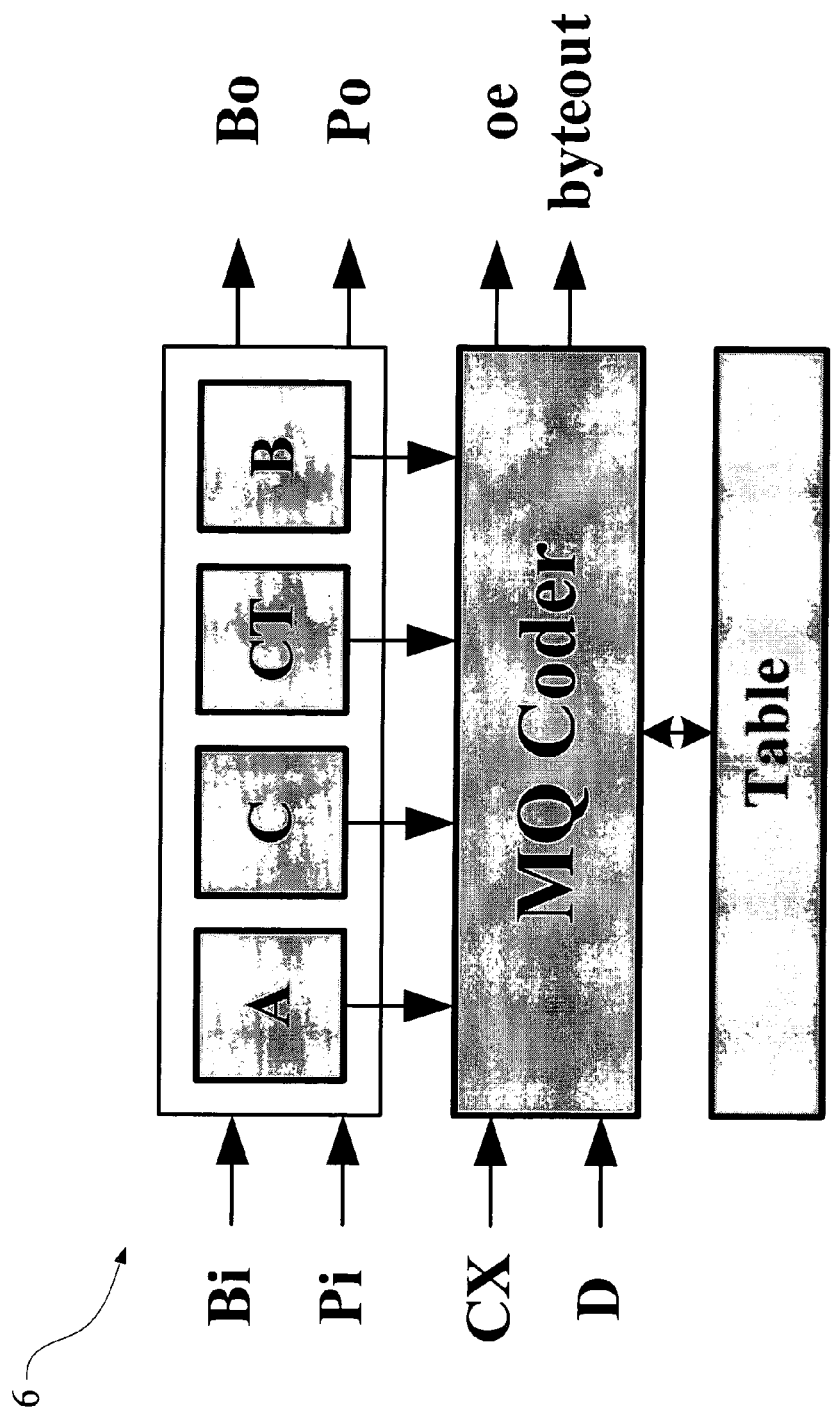
FIG. 13 is a view showing a structure of the arithmetic encoder (AE) modules according to the present invention.

In the present invention, the arithmetic encoder (AE) modules 6 processing six separate embedded bit-streams for each one decrease the demand of hardware and increase the hardware utilization. Since the present invention supports 11 bit-planes (1 bit for sign and 10 bits for magnitude), there are at most 28(3×9+1) embedded bit-streams. A most direct way to achieve this proposed structure is to have 28 arithmetic encoders. However, this leads to large hardware cost and low hardware utilization. The hardware requirement can be reduces by further analysis of two features of embedded block encoder. First, due to the exclusive property of three coding passes of a bit-plane in one clock cycle, the need of encoders can be reduced to 10 whereby to meet 10 bit-planes of magnitude in the present invention. Second, since the processing number of contexts decreases from low to high bit-plane, the largest amount of contexts for arithmetic encoder to process appears at the lowest bit-plane. Therefore, the number of encoder can be eliminated to 5 by assigning an arithmetic encoder module 6 to treat 2 bit-planes. Although the area decreases by 18% (5/18), not all elements in AE modules 6 can be reduced by the same percentage. Since every coding state register of independent bit-streams must be separated and cannot be avoided, the area, which can be eliminated, is of MQ coder and probability table. FIG. 13 shows the block diagram of arithmetic encoder module 6 wherein the blocks A, C, CT, and B are coding state registers. Each module stores six coding states of the six embedded bit-streams. By Bi and Pi, AE module selects one of the six coding state register sets and encodes the input context-decision pair.

FIG. 14 shows a comparison between the present invention and other proposed architectures by four factors. The first factor is speed defined by average number of clock cycle needed to treat a discrete wavelet transform coefficient. Referring to FIG. 14, the speed of the present invention is five times higher than other scheme in average, where the symbol n denotes the number of bit-planes of the embedded block. Since other architecture compresses bit-plane in serial, the speed is related to the number of bit-plane of embedded block. The second factor is the logic gate count. Due to parallel structure of the present invention, it needs four times more gates than others. The third factor is the on-chip memory requirement. Generally, memory occupies large chip-area. The requirement of memory of the present invention is about 4.7% of the requirement of convention. As a result of memory reduction, the area of the present invention is similar to that of conventional architectures. The last factor is off-chip memory bandwidth. Since external memory accessing consumes large power, with external memory bandwidth reduced by a factor of six, the present invention consumes lower power than others.

As already discussed, the invention has been superior to many conventional schemes. With the same chip-area and lower power consumption, the speed of this invention is six times higher than the pasts.

It should be understood that although certain preferred embodiments of the present invention have been illustrated and described, various modifications, alternatives and equivalents thereof will become apparent to those skilled in the art and, accordingly, the scope of the present invention should be defined only by the appended claims and equivalents thereof.

What is claimed is:

1. A coding method processing a discrete wavelet transform (DWT) coefficient having a plurality of bit-planes in parallel at a time to provide coding information for further coding process, comprising the steps of:
    (a) acquiring a target coefficient and neighboring coefficients around said target coefficient;
    (b) assigning a first contribution to each bit-plane of said target and said neighboring coefficients in respect to the location of their most significant bits (MSBs) and determining coding pass of each bit-plane of said target coefficient by its location of MSB and said contributions of said neighboring coefficients;
    (c) calculating first group of state variables of every bit-plane of said target and neighboring coefficients in respect to the location of their MSBs;
    (d) assigning a second contribution to each bit-plane of said neighboring coefficients according to said first group of state variables and coding pass and determining magnitude coding information obtained through a first predefined table using said contributions as references;
    (e) calculating second group of state variables of said neighboring coefficients according to said first group of state variables;
    (f) assigning a third contribution to neighboring coefficients according to said second group of state variables and determining sign coding information obtained through a second predefined table using said contributions as references.

2. The coding method as claimed in claim 1, wherein said first contribution $\phi_s^k$ of the neighboring coefficient s at k-th bit-plane is obtained from a following function if the coefficient s is processed after the target coefficient:

$$\phi_s^k = \begin{cases} 0, & k \geq m_s \\ 1, & k < m_s \end{cases}$$

wherein the symbol $m_s$ is obtained from $$m_s = \begin{cases} -1, & \mu_s = 0 \\ m, & 2^m \leq \mu_s < 2^{m+1} \end{cases}$$

where the symbol $\mu_s$ denotes the magnitude of the coefficient s.

3. The coding method as claimed in claim 1, wherein said first contribution $\phi_s^k$ of the neighboring coefficient s at k-th bit-plane is obtained from a following function if the coefficient s is processed before the target coefficient:

$$\phi_s^k = \begin{cases} 1, & k < m_s \\ 1, & (k = m_s) \,\&\, (p_s^{m_s} = 1) \\ 0, & \text{otherwise} \end{cases}$$

wherein the symbol $m_s$ is obtained from $$m_s = \begin{cases} -1, & \mu_s = 0 \\ m, & 2^m \leq \mu_s < 2^{m+1} \end{cases}$$

where the symbol $\mu_s$ denotes the magnitude of the coefficient s.

4. The coding method as claimed in claim 3, wherein, after acquiring contributions $\phi_s$ of said neighboring coefficients, the coding pass information $p_c^k$ of coefficient c at k-th bit-plane is determined by a following function:

$$p_c^k = \begin{cases} 2, & k < m_c \\ 3, & k = m_c \,\&\, \sum \phi_s = 0 \\ 1, & \text{otherwise} \end{cases}.$$

5. The coding method as claimed in claim 1, wherein said first group of state variables comprising a first variable $\lambda_s^k$ denoting whether the coefficient s in k-th bit-plane is less than it's most significant bit (MSB) and a second variable $K_s^k$ denoting whether the coefficient s in k-th bit-plane is the most significant bit (MSB).

6. The coding method as claimed in claim 1 or 5, wherein said second contribution $\sigma_s^k$ of the coefficient s in k-th bit-plane is obtained from a following function if the coefficient s is processed after the target coefficient:

$$\phi_s^k = \begin{cases} \lambda_s^k, & \kappa_s^k = 0 \\ 1, & \kappa_2^k = 1 \ \& \ p_c^k \neq 1 \ \& \ p_s^k = 1 \\ 0, & \text{otherwise} \end{cases}$$

the step (d) further comprising separately summing said second contributions utilizing summations according to horizontal, vertical, and diagonal location in respect to the target, and said magnitude coding information is obtained through the first table predefined in compliance with JPEG 2000 standard using said summations as references.

7. The coding method as claimed in claim 1, wherein said second contribution $\sigma_s^k$ of the coefficient s in k-th bit-plane is obtained from a following function if the coefficient s is processed before the target coefficient:

$$\sigma_s^k = \begin{cases} \lambda_s^k, & \kappa_s^k = 0 \\ 0, & \kappa_2^k = 1 \ \& \ p_c^k \neq 3 \ \& \ p_s^k = 1 \\ 1, & \text{otherwise} \end{cases}$$

said step (d) further comprising separately summing said second contributions utilizing summations according to horizontal, vertical, and diagonal location in respect to the target, and said magnitude coding information is obtained through the first table predefined in compliance with JPEG 2000 standard using said summations as references.

8. The coding method as claimed in claim 1, wherein said second group of state variables comprising a third variable $\alpha_s$ representing the relative position of MSBs of said target coefficient and neighboring coefficient s and a second variable $\beta_s$ denoting whether or not the MSBs of said target coefficient and neighboring coefficient s are at the same bit-plane.

9. The coding method as claimed in claim 1, wherein said third contributions $\sigma_s^x$, are obtained by $$\sigma_s^{\chi s} = \begin{cases} \alpha_s, & \beta_s = 0 \\ 1, & \beta_s = 1 \ \& \ p_c^{mc} \neq 1 \ \& \ p_s^{mc} = 1 \\ 0, & \text{otherwise} \end{cases}$$

if the neighboring coefficient s is processed after the target coefficient c, or otherwise by $$\sigma_s^{\chi s} = \begin{cases} \alpha_s, & \beta_s = 0 \\ 1, & \beta_s = 1 \ \& \ p_c^{mc} \neq 3 \ \& \ p_s^{mc} \neq 1 \\ 0, & \text{otherwise} \end{cases}$$

and said sign coding information is obtained through the first table predefined in compliance with JPEG 2000 standard using said second contributions as references.

10. The coding method as claimed in claim 5, wherein said second contribution $\sigma_s^k$ of the coefficient s in k-th bit-plane is obtained from a following function if the coefficient s is processed after the target coefficient:

$$\sigma_s^k = \begin{cases} \lambda_s^k, & \kappa_s^k = 0 \\ 1, & \kappa_s^k = 1 \ \& \ p_c^k \neq 1 \ \& \ p_s^k \neq 1 \\ 0, & \text{otherwise} \end{cases}$$

the step (d) further comprising separately summing said second contributions utilizing summations according to horizontal, vertical, and diagonal location in respect to the target, and said magnitude coding information is obtained through the first table predefined in compliance with JPEG 2000 standard using said summations as references.

* * * * *